United States Patent [19]

Brownscombe

[11] 3,834,800
[45] Sept. 10, 1974

[54] PROJECTOR VIEWER WITH INDICATING DEVICE

[75] Inventor: Philip J. Brownscombe, Millington, N.J.

[73] Assignee: Dietzen Corporation, Chicago, Ill.

[22] Filed: Apr. 30, 1973

[21] Appl. No.: 355,590

[52] U.S. Cl. ............................... 353/27, 116/124 R
[51] Int. Cl. .......................................... G03b 23/08
[58] Field of Search ................... 353/27; 116/124 R

[56] References Cited
UNITED STATES PATENTS

| | | | |
|---|---|---|---|
| 3,560,083 | 2/1971 | Brownscombe | 353/27 |
| 3,566,524 | 3/1971 | Irasek | 353/27 |
| 3,718,390 | 2/1973 | Holliday | 353/27 |

*Primary Examiner*—Louis R. Prince
*Assistant Examiner*—Steven L. Stephan
*Attorney, Agent, or Firm*—Johnston, Keil Thompson & Shurtleff

[57] ABSTRACT

A projector viewer adapted to read microfiche transparencies through a projection onto a screen with an indicator device embodying a transparent sheet with index markings. A longitudinally flexible, laterally rigid transparent strip is connected to a carriage assembly which bears the microfiche between glass plates. The strip moves behind the transparent sheet and bears position indicating means coordinating the index markings with the respective frames of the microfiche.

6 Claims, 6 Drawing Figures

PROJECTOR VIEWER WITH INDICATING DEVICE

The use of microfilm for the storage of copies of papers of a diverse nature in government and business records has grown significantly in the past decade. The microfilm reduces considerably the storage space in comparison with the storage space which would be required for the original records kept on the microfilm. However, the microfilm records cannot be studied without projecting them and enlarging them to a size sufficient for reading.

There has been a recurring demand for a simple viewing device or a reader which will permit a card carrying the microfilm record to be moved easily by one hand from frame to frame of the microfilm within a row or to move from one row of images to another. The viewing device or reader of this invention is designed to meet this demand. It is especially suitable for use with strip film in transparent jackets or for transparent film cards which consist of film sheets bearing a number of images in a rectangular pattern, either in a single row or two or more rows.

Briefly, the viewing device or reader of this invention comprises a light source which projects its light through a transparent holding means for the microfilm into a focusing lens. The image is reflected by a mirror system inside the cabinet of the projector viewer onto a self-contained screen. The projected image is enlarged to a size sufficient for direct reading on the screen.

It is often the case that the information desired on a microfiche film is indexed through disignations of vertical columns and horizontal rows, e.g., by assigning the vertical columns a numerical designation and the horizontal rows a letter designation. Hence, the information desired from the microfiche can be most quickly found if the reader contains an indicating device coordinating the particular frame or frames of the microfiche with a correspondingly marked indicating means.

One known way of indicating which portion or frame of the microfiche is being projected is the attachment of a pointer to the microfiche carrier with the end of the pointer scanning a grid provided on the upper surface of the base of the projector. This combination, while useful, has the undesirable characteristics of requiring the base of the projector (or the grid-bearing member) to extend further forward than is necessary. Also, the grid is substantially horizontal and is awkward to view by a person seated at a desk or table.

The subject invention constitutes improvements over prior known indicating devices by providing the grid for the indicating device on the front wall of the base of the projector. The indicator consists of the transparent panel with grid markings thereon and a longitudinally flexible, substantially laterally rigid strip attached to the carrier and passing curvately therefrom between the transparent panel or sheet bearing the indexing grid and a solid backing plate. The flexible strip moves with the carrier in a manner whereby its end behind the transparent panel or sheet moves up and down as the carrier is moved forwardly and rearwardly and laterally as the carrier is moved laterally.

The flexible strip travels as aforedescribed with about a 90° bend as it enters the passageway between the backing plate and the transparent panel or sheet. The particular construction of the strip is an important innovation of the invention. Thin metal strips, pieces of belting and fabric strips have not proven satisfactory because the friction on the strip, particularly in the passageway, including its curved portion, causes such strips to twist so that the lower indicating end is not in proper position relative to the grid markings on the transparent sheet or panel.

The indicating strip of the invention preferably comprises a narrow, flexible fabric strip to which rectangular cross strips of a thermoplastic polymer are bonded. This indicating strip thus comprises a row of side-by-side, rectangular, rigid, cross bars adhesively or otherwise secured to the longitudinal fabric strip. The length of the cross bars may be greater than the width of the fabric strip with the strip extending along the center portion of the cross bars at right angles thereto.

Such indicating strips are very flexible to bending in one direction. They withstand axial compression loading, which is important in the movement of the indicating strip with the carriage as the latter moves in a front to rear or rear to front direction. The indicating strips of the invention are further rigid with respect to lateral bending and are resistant to twisting about their longitudinal axes.

A preferred embodiment of the invention is illustrated in the drawings wherein.

Figure 1:
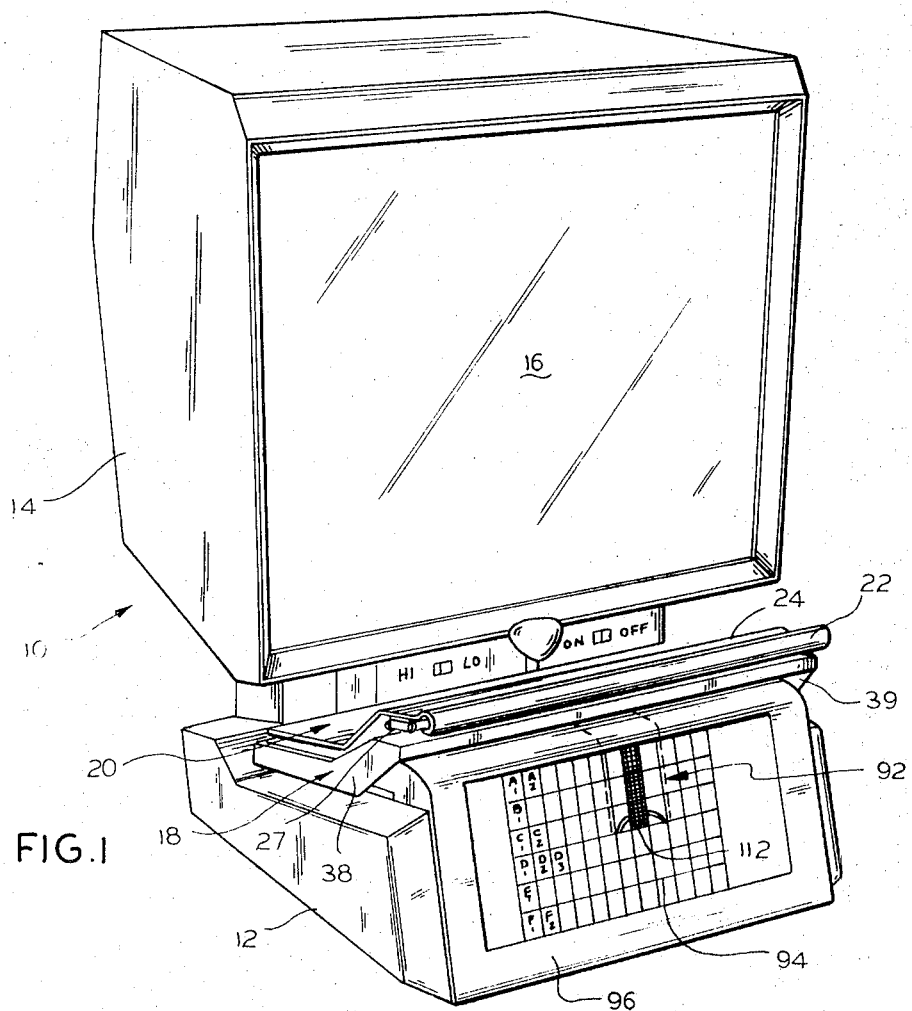
FIG. 1 is a front, perspective view of a microfilm reader having the transparent indexing panel on the front wall of the base of the reader.

Referring to the drawings, the reader 10 is composed of a hollow base 12 and an upper, hollow cabinet 14 having as its front face a translucent screen 16. The cabinet 14 is of conventional construction and its contents are not illustrated in detail. The cabinet 14 has therein mirrors disposed at appropriate angles for reflecting and projecting onto the screen 16 the image projected from a light projection means within the base 12 through the carriage assembly and the microfiche held between the glass plates or flats, a segment of the rear mirror 14a being shown in FIG. 4. An exemplary construction of the cabinet 14 and the light projection assembly is illustrated in my U.S. Pat. No. 3,560,083.

Figure 4:
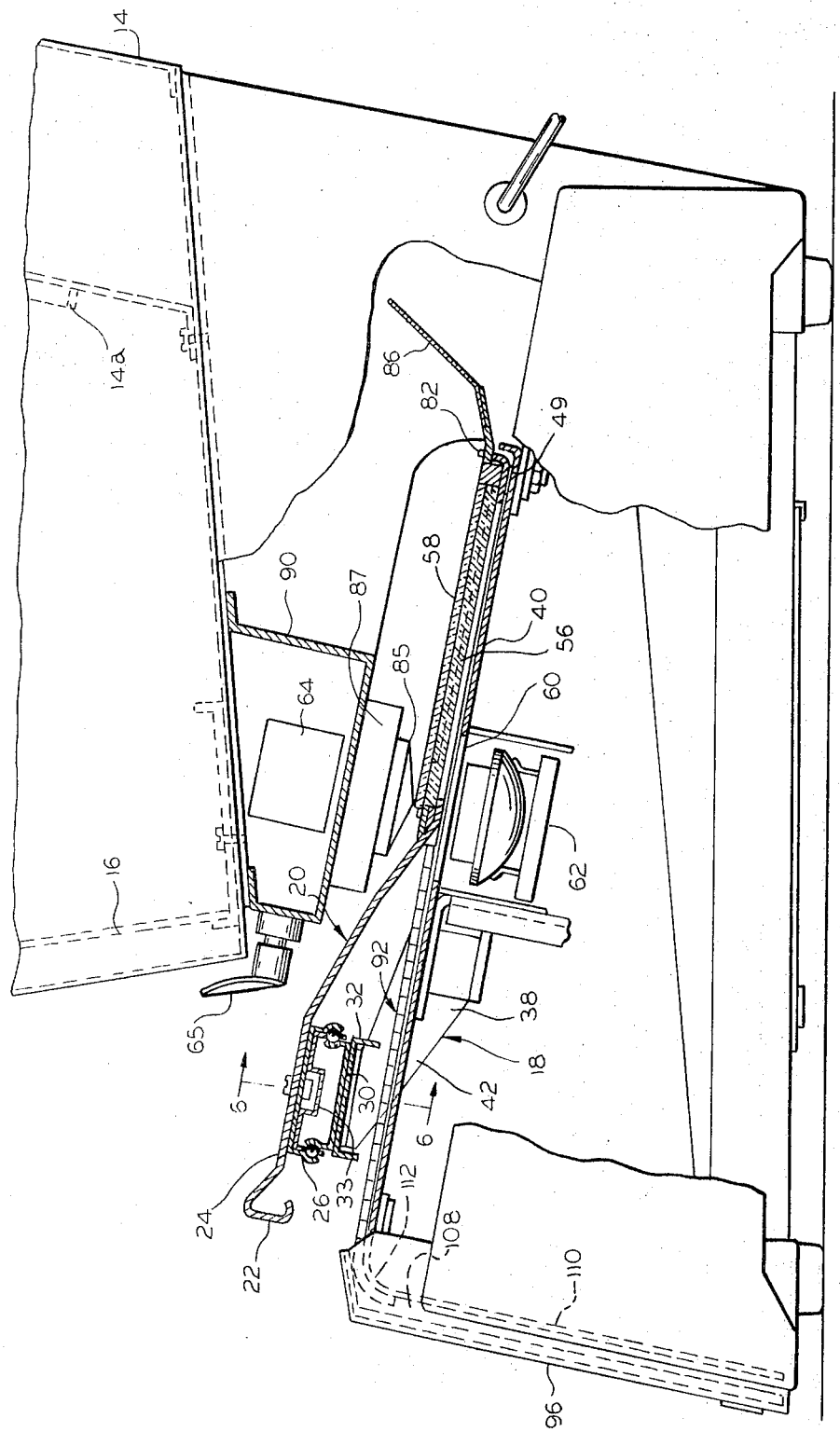
FIG. 4 is a fragmentary, side elevation, partly in section, of the reader of FIG. 1.
Figure 5:
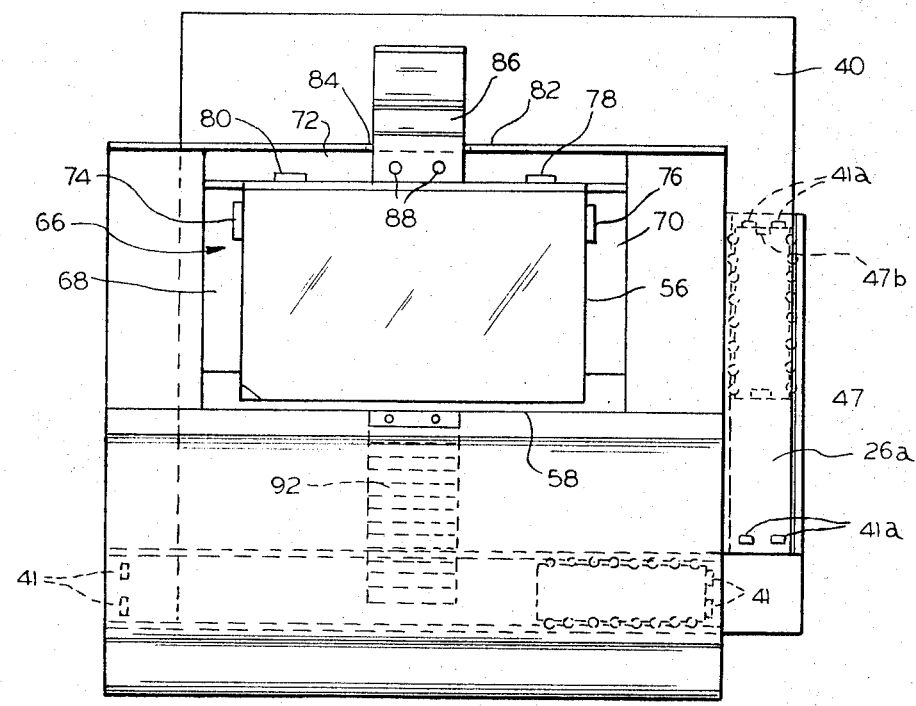
FIG. 5 is a top plan view of the carriage assembly and glass plates between which the microfiche is held for moving the microfiche to the desired frame thereof.
Figure 6:
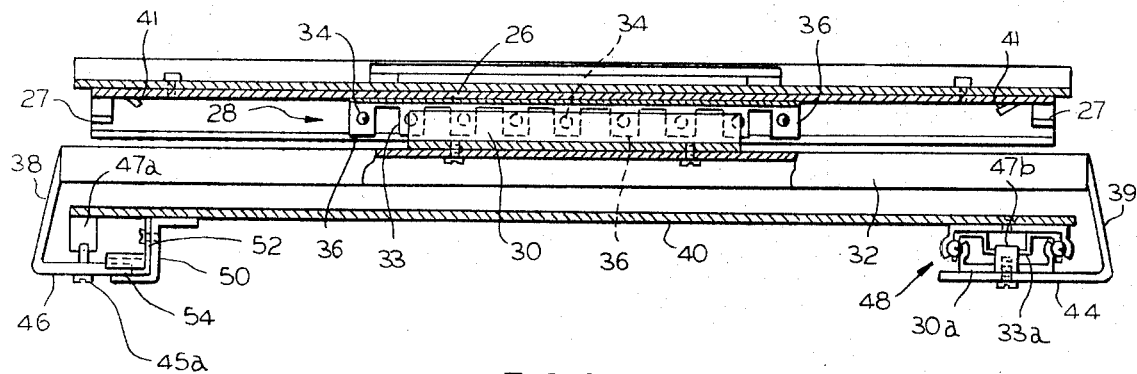
FIG. 6 is a section view, taken on section plane 6—6 of FIG. 4 of the carriage assembly.

The carriage assembly comprises a lower carriage 18 adapted to move forwardly and rearwardly on the base 12 and a further carriage assembly 20 mounted on the lower carriage assembly 18 and adapted to move laterally relative to the base 12. The upper carriage assembly comprises a plate having its forward end bent into a C-configuration forming a handle through which the carriage assemblies are moved. The forward portion of this carriage assembly has a flat segment 24 adjacent the handle 22. Attached to the underside of this flat portion 24 is the upper channel 26 of a conventional ball slide 28. As can be seen in FIGS. 4 and 6, the ball slide 28 comprises three ball race members composed of a lower, inner channel 30 attached to the cross channel 32 of the lower carriage assembly 18, a ball retaining channel 33, and an upper, outer channel 26. The ball bearings 34 of the ball slide are rotatably held in side ears 36 of the channel 33 against the ball race grooves of the inner channel 30. This ball slide allows the upper carriage assembly 20 to be moved by hand laterally at right angles to the lower carriage assembly 18 until the lower channel 30 strikes the inwardly curled ears 27 (FIG. 6) at the ends of the upper channel. The rear portion of the upper carriage assembly bears a Teflon strip 49 which slides on a fixed or base plate 40. Additionally, the upper channel 26 has a pair of struck out, downwardly angulated tabs 41 (FIGS. 5 and 6) near opposite ends thereof. The outer edge portions of the ball channel 33 may strike these tabs as the channel 33 moves during lateral movement of the upper carriage assembly and thus limit the movement of the carriage while also precluding displacement of the ball carriage out of the inner and outer races.

The lower carriage assembly 18 is made up of the cross channel 32 and side arms 38 and 39. Each side arm comprises a downwardly and rearwardly extending segment 42 and a rearward, inwardly directed, horizontal plate 44 and 46. The plate 44 is slidably mounted relative to the base plate 40 by a ball slide 48 of similar construction to the ball slide 28. The plate 46 is slidably received in a groove formed by the bracket bar 50 which is attached to the underside of the fixed plate 40 and an L-bracket 52 attached by screws or rivets to the bracket 50 in a manner forming the groove which slidably receives the edges 54 of the horizontal plate 46. Limit stops for the front to rear movement of the lower carriage may be provided by bolt 45a projecting upwardly through the plate 46, which bolt strikes stop tab 47a provided on the rear portion of fixed base plate. Tabs 47b on the ends of the inner channel member 30a keep the ball channel 33a within the channel member 30a. A pair of struck out, downwardly angulated tabs 41a near opposite ends of the outer channel 26a serve the same limit stop function as tabs 41.

The foregoing carriages provide movement for a lower glass plate 56 and an upper glass plate 58 which are supported on the lower carriage assembly 18. The fixed plate 40 has an aperture 60 through which light from a conventional bulb and reflector assembly (not shown) is projected via the condenser lens assembly 62 through the aperture 60, the glass plates 56 and 58 and a microfiche flatly held therebetween through an adjustable, objective focusing lens assembly 64 focused by turning focusing knob 65 (illustrated only diagrammatically in FIG. 4) into the cabinet 14. The objective or focusing lens assembly includes a follower shoe 85 which slides on the upper glass plate and is mounted on a lever 87 and connected by lens mounting and additional levers described in detail in my copending application, the subject matter of which is not concerned with the invention herein claimed.

The image projected from the microfiche is reflected onto the screen 16 in the manner heretofore described. The lower glass plate 56 is smaller than the upper glass plate 58. The latter plate has a U-frame 66 adhesively secured to its underside. The U-frame comprises side legs 68 and 70 and a cross leg 72. The latter has depending bosses 74, 76, 78 and 80 which bear against the side and rear edges of the lower glass plate 56. The rear edge of the lower glass plate 56 abuts against the flange 82 along the rearward edge of the upper carriage assembly. This flange has a notch 84 which allows the rearwardly directed arm 86 to extend through the flange 82. The arm 86 is fixedly attached by rivets 88 to the cross leg 72 of the U-frame 66.

The arm 86 projects rearwardly and upwardly. It is used to tilt the upper glass plate when the carriage assembly is drawn forwardly in the reader assembly. This arm 86 strikes the lower rear edge of a housing 90 for the objective lens whereby a microfiche may be inserted or withdrawn from its position between the two glass plates.

The position of the microfiche relative to the light projection portion of the reader is ascertainable from the position of the lower edge of the indicator strip 92 relative to the grid-divided transparent sheet 94 mounted in the front wall 96 of the base 12. This indicator strip and the grid-marked transparent sheet 94 are coordinated with the frames of the microfiche in a manner whereby the central portion of the lower end of the indicator strip 92 indicates which frame by vertical column and horizontal row is in the light beam which is projected onto the screen 16.

Figure 2:
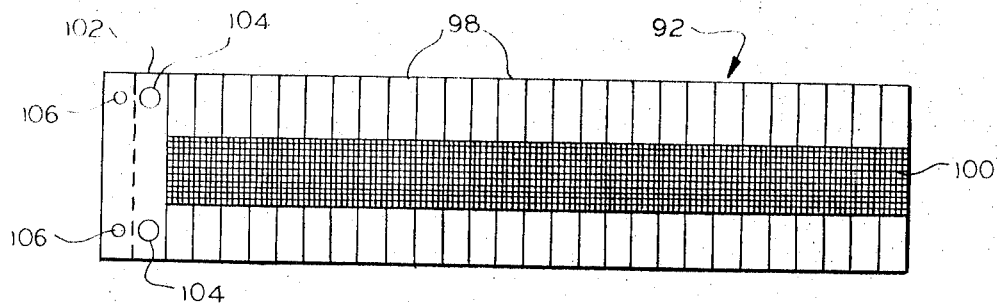
FIG. 2 is a top plan view of the indexing strip aforedescribed.
Figure 3:
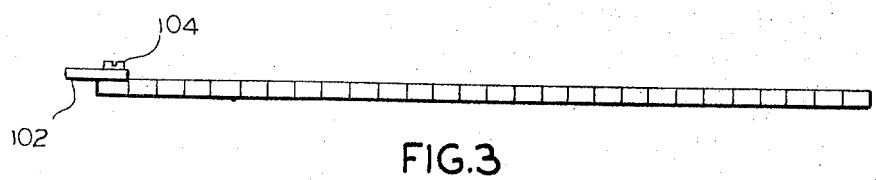
FIG. 3 is a side elevation of such strip.

The indicator strip is shown in detail in FIGS. 2 and 3. It comprises a row of side-by-side rectangular, rigid cross bars 98 which are adhered to a longitudinal, flexible, fabric strip 100 extending across the medial portion of the cross bars and adhesively secured to the underside thereof. The rearward end of the strip 92 has a bar 102 fixedly attached by bolts 104 to the rear end of the flexible strip. The bar 102 is also attached by bolts or the like extending through holes 106 to the center portion of the upper carriage assembly so that the strip moves in coordination with the carriage assembly in both its front to rear and lateral movements.

As can be seen in FIG. 4, the indicator strip 92 lies on the fixed plate 40. Its forward and intermediate portions, depending upon the position of the carriage assembly, extend into a passageway 108 which is formed by the transparent sheet bearing front wall 96 and a back panel 110 substantially parallel with the front wall 96. The back panel 110 may be formed integral with the fixed plate 40 or may be a separate member attached to the fixed plate. The juncture between the back panel 110 and the fixed plate 40 is a rounded corner 112 over which the flexible indicator strip 92 passes in its movement into and out of the passage 108.

A film or transparency, such as a microfiche, is inserted between the glass plates by drawing the carriage assemblies forwardly until the arm 86 strikes the lower rear corner of the housing 90 and causes the upper glass plate 58 to pivot about its rear edge to a degree sufficient to insert the film or transparency between the glass plates. The carriage assembly is then pushed rearwardly, whereby the upper glass plate 58 returns to its position shown in FIG. 4 with the film or transparency held flatly between the two glass plates.

The person using the viewer can then move the carriage assembly to the desired frame or portion of the film or transparency which he desires to view. This may be achieved quickly by noting the position of the center portion 112 at the frontal edge thereof relative to the frames of the grid-divided transparent sheet 94.

The invention thus provides a projection reader particularly useful in the projection and reading on a screen of an enlarged image from a film or transparency, particularly a microfiche having a plurality of image frames in a grid arrangement. The reader assembly has a base member including an upper support member or top wall with an aperture for projecting a light beam therethrough. The reader embodies a carriage assembly or carriage means for movement across the aperture in the upper support member or top wall in all directions, i.e., front to rear, rear to front, side to side and diagonally. In such movement, the carriage assembly moves a pair of superposed transparent plates mounted on the carriage means or assembly through a light beam projected through the aperture and the transparent plates. The latter have a microfiche or other film or transparency held flatly therebetween.

The front wall of the base member is composed of a front wall and a backing plate or panel behind the front wall in spaced relationship therebetween to form a space or passageway therebetween. The front wall or plate includes a translucent or transparent panel having indexing markings thereon, e.g., markings corresponding to the grid arrangement of frames of a microfiche.

An indexing means is provided by using a longitudinally flexible, laterally rigid strip attached at one end to the carriage means or assembly and extending into the space of passageway aforedescribed. The opposite end of the strip bears position indicating means, e.g., the tip portion of the flexible strip. This indexing means is used to coordinate the movement of the carriage assembly to a particular portion of the film or transparency, such as one of the respective frames of the microfiche, so that the viewer can quickly locate and project onto the screen an enlarged view of the image or image frame which he desires to view.

Preferably, the longitudinally flexible, indexing strip passes over a rounded corner at the entrant portion of the passageway or space. In order to impart to it the desired characteristics of lateral rigidity and longitudinal flexibility, this strip preferably comprises a row of side-by-side, rectangular, rigid, cross bars secured to a longitudinal, flexible strip extending along the bottom side of said cross bars.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A movable carriage assembly and position indicator therefor for a reader for a film having a plurality of image frames and held flatly between transparent plates comprising a base having a top wall and a front wall with a transparent sheet bearing index markings, a back panel behind and spaced from said front wall and defining with said front wall a narrow passageway movable, carriage means for said transparent plates mounted on the upper portion of said base for substantially planar movement of said plates, and a longitudinally flexible and laterally rigid strip attached at one end thereof to said carriage and extending across said top wall and into said passageway with the opposite end portion of said strip behind said transparent sheet to facilitate positioning of said carriage means for projection of a particular image frame of the film by noting the position of an indexing means on said opposite end portion relative to said index markings.

2. An assembly as claimed in claim 1, said top plate and said back panel being connected by a rounded corner over which said strip passes in its movement in said passageway.

3. An assembly as claimed in claim 1, said strip comprising a row of side-by-side, rectangular, rigid, cross bars secured to a longitudinal, flexible strip extending along the bottom side of said cross bars.

4. A microfiche reader assembly comprising a base member having an upper support member with an aperture for projecting a light beam therethrough, carriage means mounted on said support member for movements in all directions in a plane perpendicular to the light beam relative to said support member, a pair of superposed transparent plates mounted on said carriage means for movement across said aperture, said transparent plates adapted to hold flatly therebetween a microfiche having a plurality of image frames in grid arrangement, a front wall on said base member including a backing plate and a front plate with a space therebetween, said front plate including a translucent or transparent panel having markings corresponding to said grid arrangement, a longitudinally flexible and laterally rigid strip attached at one end to said carriage means and extending into said space in the front panel behind said translucent or transparent panel, and said strip having position indicating means coordinating said markings with the respective frames of said microfiche, whereby said markings and indicating means can be used to position said carriage means for projection of a desired image frame.

5. As assembly as claimed in claim 4, said base plate and said back panel being connected by a rounded corner over which said strip passes in its movement in said passageway.

6. An assembly as claimed in claim 4, said strip comprising a row of side-by-side, rectangular, rigid, cross bars secured to a longitudinal, flexible strip extending along the bottom sides of said cross bars.

* * * * *